United States Patent
Couturier et al.

(10) Patent No.: US 11,933,040 B2
(45) Date of Patent: Mar. 19, 2024

(54) FISH-MOUTH-RESISTANT WATERPROOFING MEMBRANE

(71) Applicant: GCP Applied Technologies Inc., Cambridge, MA (US)

(72) Inventors: Marysusan Couturier, Framingham, MA (US); Jyoti Seth, Andover, MA (US)

(73) Assignee: GCP Applied Technologies Inc., Alpharetta, GA (US)

( * ) Notice: Subject to any disclaimer, the term of this patent is extended or adjusted under 35 U.S.C. 154(b) by 666 days.

(21) Appl. No.: 15/734,377

(22) PCT Filed: Jun. 15, 2018

(86) PCT No.: PCT/US2018/037704
§ 371 (c)(1),
(2) Date: Dec. 2, 2020

(87) PCT Pub. No.: WO2019/236112
PCT Pub. Date: Dec. 12, 2019

(65) Prior Publication Data
US 2021/0164219 A1  Jun. 3, 2021

Related U.S. Application Data

(60) Provisional application No. 62/680,213, filed on Jun. 4, 2018.

(51) Int. Cl.
*E04B 1/66* (2006.01)
*B32B 5/02* (2006.01)
(Continued)

(52) U.S. Cl.
CPC .............. *E04B 1/665* (2013.01); *B32B 5/022* (2013.01); *B32B 5/024* (2013.01); *B32B 5/18* (2013.01);
(Continued)

(58) Field of Classification Search
CPC ......... E04B 1/665; B32B 5/022; B32B 5/024; B32B 5/18; B32B 5/245; B32B 27/065;
(Continued)

(56) References Cited

U.S. PATENT DOCUMENTS

| | | |
|---|---|---|
| 3,725,185 A | 4/1973 | Curtis |
| 5,406,759 A | 4/1995 | DeRosa et al. |

(Continued)

FOREIGN PATENT DOCUMENTS

| | | |
|---|---|---|
| EP | 1227188 | 7/2002 |
| EP | 0731232 | 3/2019 |

(Continued)

OTHER PUBLICATIONS

Machine Translation of KR-20160124104-A. (Year: 2016).*

(Continued)

*Primary Examiner* — Patricia L. Nordmeyer

(57) ABSTRACT

The present invention provides methods and articles for achieving puncture-resistant waterproofing membranes and for waterproofing building and civil engineering surfaces without requiring the use of separate protection boards. Exemplary membranes and methods of the invention rely on relatively thin, flexible composite layers to provide impact resistance while yet facilitating seaming between adjacent installed membranes and minimizing formation of wrinkles, leakage channels, and "fish mouth" openings, particularly at substrate details or other surface irregularities.

20 Claims, 1 Drawing Sheet

(51) Int. Cl.
  *B32B 5/18*   (2006.01)
  *B32B 5/24*   (2006.01)
  *B32B 27/06*  (2006.01)
  *B32B 27/32*  (2006.01)
  *B32B 27/36*  (2006.01)
  *B32B 27/40*  (2006.01)
  *C09J 7/29*   (2018.01)
  *E02D 31/02*  (2006.01)
  *E04D 5/10*   (2006.01)
  *E04D 5/14*   (2006.01)

(52) U.S. Cl.
  CPC ............ *B32B 5/245* (2013.01); *B32B 27/065* (2013.01); *B32B 27/32* (2013.01); *B32B 27/36* (2013.01); *B32B 27/40* (2013.01); *C09J 7/29* (2018.01); *E02D 31/02* (2013.01); *E04D 5/10* (2013.01); *E04D 5/148* (2013.01); *B32B 2260/021* (2013.01); *B32B 2260/046* (2013.01); *B32B 2266/025* (2013.01); *B32B 2266/08* (2013.01); *B32B 2307/7265* (2013.01); *B32B 2419/06* (2013.01); *C09J 2301/122* (2020.08); *C09J 2301/162* (2020.08); *C09J 2301/302* (2020.08); *C09J 2400/243* (2013.01); *C09J 2400/263* (2013.01); *C09J 2423/006* (2013.01); *C09J 2475/006* (2013.01)

(58) Field of Classification Search
  CPC ......... B32B 27/32; B32B 27/36; B32B 27/40; B32B 2260/021; B32B 2260/046; B32B 2266/025; B32B 2266/08; B32B 2307/7265; B32B 2419/06; C09J 7/29; C09J 2301/122; C09J 2301/162; C09J 2301/302; C09J 2400/243; C09J 2400/263; C09J 2423/006; C09J 2475/006; C09J 2203/346; E02D 31/02; E04D 5/10; E04D 5/148; E04D 12/002
  See application file for complete search history.

(56) References Cited

U.S. PATENT DOCUMENTS

| | | |
|---|---|---|
| 5,687,517 A | 11/1997 | Wiercinski et al. |
| 5,780,144 A | 7/1998 | Bradley |
| 5,925,706 A | 7/1999 | Roberts |
| 6,122,887 A | 9/2000 | Massett et al. |
| 6,444,291 B2 | 9/2002 | Phillips et al. |
| 6,546,679 B1 | 4/2003 | Bushberger |
| 6,684,579 B2 | 2/2004 | Brunson et al. |
| 7,488,523 B1 | 2/2009 | Muncaster et al. |
| 8,104,245 B2 | 1/2012 | Whelan et al. |
| 8,713,879 B2 | 5/2014 | Wiercinski et al. |
| 9,702,152 B2 | 7/2017 | Sievers et al. |
| 2001/0004490 A1 | 6/2001 | Wait |
| 2004/0127120 A1 | 7/2004 | Zanchetta et al. |
| 2006/0234030 A1 | 10/2006 | Thompson-Colon et al. |
| 2009/0113841 A1 | 5/2009 | Whelan et al. |
| 2011/0214797 A1 | 9/2011 | Seth et al. |
| 2012/0152437 A1 | 6/2012 | Cisneros |
| 2014/0115991 A1 | 5/2014 | Sievers et al. |
| 2014/0377519 A1 | 12/2014 | Rancich et al. |

FOREIGN PATENT DOCUMENTS

| | | | |
|---|---|---|---|
| KR | 20160124104 A | * | 10/2016 |
| WO | 2008057343 | | 5/2008 |
| WO | 2017058154 | | 4/2017 |

OTHER PUBLICATIONS

Copenheaver, Form PCT/ISA/210, International Search Report for PCT/US2018/037704, dated Aug. 29, 2018, 2 pages.

Copenheaver, Form PCT/ISA/237, Written Opinion of the International Searching Authority for PCT/US2018/037704, dated Aug. 29, 2018, 10 pages.

\* cited by examiner

FISH-MOUTH-RESISTANT WATERPROOFING MEMBRANE

FIELD OF THE INVENTION

The present invention relates to waterproofing of building surfaces; and, more particularly, to a method and waterproofing membrane that provide impact resistance to avoid punctures and that facilitate seaming between adjacent membranes at their overlaps, whereby formation of wrinkles or leakage channels in the membrane carrier film, or even of film separation (which results in "fish-mouth" gaps), are minimized or avoided altogether.

BACKGROUND OF THE INVENTION

The use of waterproofing laminate membranes in construction is well known. For vertical wall constructions, applications of torch-on, self-adhered membranes or fluid-applied coatings are common. As walls are typically made of concrete, the adhesion of the waterproofing membranes must be strong. For below grade applications, the waterproofing membrane must also withstand the impact of stones and dirt which are backfilled against the installed membrane. In areas with a high water table, the membrane also must withstand high hydrostatic head forces.

The most common self-adhered type laminate membranes comprise an HDPE carrier film having 2-6 mils thickness, and a rubber-containing adhesive (e.g., rubber modified bitumen) having 40-60 mils thickness. For ease in shipment and application, such membranes are supplied in rolls and packaged in cardboard boxes. At the installation site, the applicator will remove the rolled membrane from the box, remove a small portion of release liner from the top roll edge to expose a portion of the adhesive which will then be adhered to a wall or other surface, and then unroll the membrane over the surface area intended to be protected. The applicator will then remove the remainder of the release liner while smoothing out the membrane until the bottom roll edge is reached and the roll is cut.

While such laminate membranes have been around for decades and have a proven track record, these laminates have inherent disadvantages. The HDPE film layer, while providing excellent resistance to water penetration, tends to be stiff and to resist conformance to surface roughness and details. It is further susceptible to wrinkles that sometimes arise during processing, and these can later become channels for water ingress. The HDPE film can also come loose and form what is commonly known in the industry as "fish-mouths." These can also become channels for water ingress, particularly at the seams between membranes, giving rise to water migration between layers.

To achieve adequate adhesion and impact protection from installation and construction activity (e.g., from tools, rebar, and equipment impacts), an adhesive thickness of 40-60 mils is typically used. This creates a very heavy roll (as a 200 square foot roll can weigh 80 pounds). This can become very labor intensive for the applicator, especially if they are working in lifts.

For post applied below grade applications, the self-adhered membrane must be protected from damage due to backfilling of the excavation. Backfill type can vary greatly from location to location. The best practice has been to avoid the use of backfill having stones greater than two inches, and compacting the fill every foot. In actual practice, however, the backfill operators do not tend to pay attention to the backfill being used. In some jobs, old concrete is crushed and reused as backfill, which increases the risk that installed membrane could be punctured during backfill operations.

In some instances, to save time, the operator will not compact the filled soil during the backfill operation. This leads to settling of the soil at a later time. This settling can create significant shear forces on the membrane which can cause the membrane to slide down the wall. To protect the waterproofing membrane for this, a protection board is placed over the waterproofing membrane. This protection board can be asphaltic based, XPS boards or drainage boards. All of these require an additional step and product added to the construction practice.

In view of the foregoing disadvantages, the present inventors believe that it is desirable to have a light-weight, puncture-resistant membrane that does not require separate protection board for resisting the impacts arising during backfill or minimizing the risks arising from sloppy backfill practices. Such a puncture-resistant membrane can help to avoid two-step processes wherein a self-adhered membrane is installed first onto a construction surface, and then a protection sheet, such as a polyolefin foam, is subsequently installed (See e.g., EP 0731232A2).

The present inventors believe that they can improve upon the two-step process by avoiding the extra protection board installation step, and the dangers that can arise when separate protection board is used.

The present inventors believe that they can also improve upon known puncture-resistant waterproofing designs which have been taught for use without protection boards. For example, in U.S. Pat. No. 5,406,759 (which is owned by the common assignee hereof), DeRosa et al. taught a multi-layer laminate wherein a rigid film material was situated between two layers of rubberized asphalt, and an outer layer comprising either HDPE film or foam was used. As another example, in U.S. Pat. No. 8,104,245, Whelan et al. taught a waterproofing membrane having an outer plastic material having thickness of 60 mils or greater, a backing layer of foam having thickness of 60 mils or greater foam, and a pressure sensitive adhesive layer. As in these and many other prior art membrane laminate designs, the present inventors believe that either rigidity, overall thickness, which are desirable for puncture-resistance, contribute significantly to the inherent disadvantage of loss of flexibility which is otherwise needed in the overall membrane design for minimizing channels, wrinkles, or "fish-mouthing," when the membrane is applied over details and other surface irregularities, particularly at or near the overlaps between adjacent installed membranes. Moreover, the present inventors believe that an improved waterproofing laminate membrane design is needed to facilitate convenient installation, because rigid and/or overly-thick membranes are heavy and clumsy to apply, and they do not form convenient overlap seams.

The minimum thickness of the composite membrane in U.S. Pat. No. 8,104,245 is 140 mils and a 200 square foot roll would have a diameter of 13.3". This represents a 33% increase in roll size as compared to the standard post applied membrane, which runs 10" high. This increase in roll height will mean less product per pallet and will increase shipping costs.

While there have been numerous approaches to meet both waterproofing and protection functions, none of the current membrane designs appear to be complete. Thus, the present inventors believe that a need exists for a lightweight, rollable/unrollable, and self-protecting, self-adhering waterproofing laminate membrane.

SUMMARY OF THE INVENTION

In surmounting disadvantages of prior art waterproofing membrane designs, the present inventors have achieved a membrane design that provides self-protection for below grade applications, as well as various other favorable design characteristics, such as excellent nail-sealability when used as roofing underlayment membranes, and resistant leakage arising from film material wrinkles, channels, or "fish-mouthing," particularly when the membrane is installed on surface irregularities and details.

An exemplary method of the present invention for waterproofing a building or civil engineering substrate surface comprises:

providing a rolled waterproofing laminate membrane with a removable release sheet, the membrane when unrolled and with release sheet removed having a total composite thickness in the range of 12 mils to 115 mils;

unrolling the waterproofing laminate membrane and positioning the membrane onto a substrate surface, and removing the release sheet during or after unrolling or positioning of the waterproofing laminate membrane, the laminate membrane comprising:

a) an outer continuous layer having total average thickness in the range of 2 mils to 20 mils, said continuous layer comprising polyolefin or thermoplastic polyurethane and having a partially or entirely embedded reinforcing fibrous or textile structure chosen from mesh, spun-bonded fiber, or random laid fiber, whereby the polymer fills in any voids or interstices within the reinforcing structure to prevent lateral water migration within the laminate membrane when the membrane is installed upon a building or civil engineering surface;
   b) a pressure sensitive adhesive layer having total thickness in the range of 5 mils to 40 mils;
   c) a closed-cell foam layer having a total thickness in the range of 5 mils to 55 mils and being located intermediate between and attached to each of the outer continuous layer and the pressure sensitive adhesive layer; and
   d) a removable release sheet for protecting the pressure sensitive adhesive layer on a face opposite the face to which it is attached to the closed-cell foam layer, the removable release sheet being removed from the laminate membrane during or after it is unrolled or positioned upon the substrate surface.

It is preferred that, for sub-grade waterproofing applications, the reinforcement used in the membrane should not allow water migration between the outer continuous layers. While experimenting with various reinforcement materials, the present inventors also surprisingly discovered that without the reinforcement in the outer continuous layer, the membrane could also be used for sealing nails or roofing fasteners when the membrane was installed on a sloped roof.

Hence, exemplary method of the present invention for waterproofing a sloped roof comprises:

providing a rolled waterproofing laminate membrane with a removable release sheet, the membrane when unrolled and with release sheet removed having a total composite thickness in the range of 12 mils to 115 mils;

unrolling the waterproofing laminate membrane and positioning the membrane onto the building surface, and removing the release sheet during or after unrolling or positioning of the waterproofing laminate membrane on the building surface, the laminate membrane comprising:

a) a continuous outer polyolefin or thermoplastic polyurethane layer having total average thickness in the range of 2 mils to 20 mils;
   b) a pressure sensitive adhesive layer having total thickness in the range of 5 mils to 40 mils; and
   c) a closed-cell foam layer having a total thickness in the range of 5 mils to 55 mils and being located intermediate between and attached to each of the outer continuous layer and the pressure sensitive adhesive layer; and
   d) a removable release sheet for protecting the pressure sensitive adhesive layer on a face opposite the face to which it is attached to the closed-cell foam layer, the removable release sheet being removed from the laminate membrane during or after it is unrolled or positioned upon the building surface.

The present invention also provides membrane laminates having the layers and arrangements as described above. In further exemplary embodiments, the continuous outer layer (e.g., polyolefin, thermoplastic urethane) could have elevated projections (e.g., ridges) or protuberances to improve impact resistance.

Further benefits and features of the invention are provided in further detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
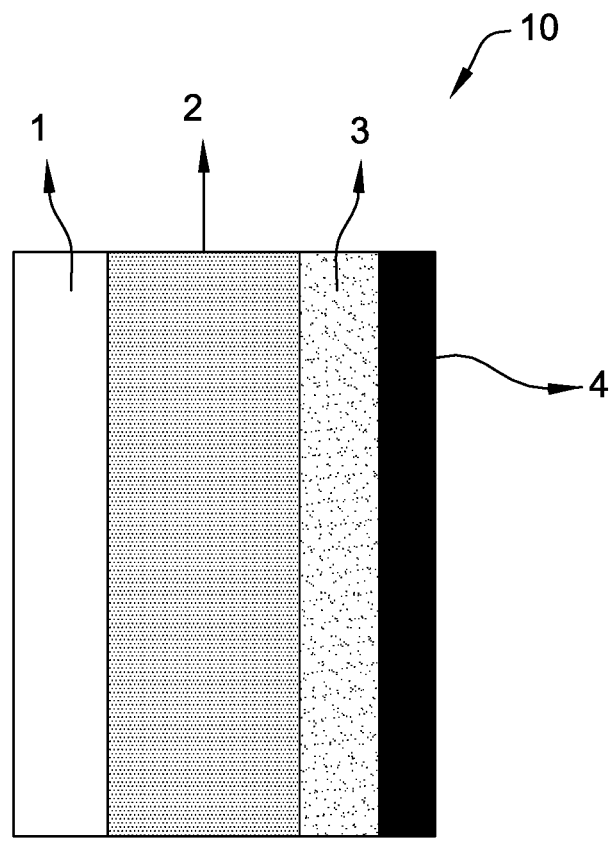
FIG. 1 is a plan diagram of an exemplary composite laminate membrane of the present invention.

As illustrated in FIG. 1, an exemplary composite laminate membrane (designated at 10) of the present invention comprises a waterproofing film layer (designated at 1), a foam layer (designated at 2), a waterproofing adhesive layer (designated at 3), and a removable release sheet for protecting the adhesive layer (designated at 4).

Figure 2:
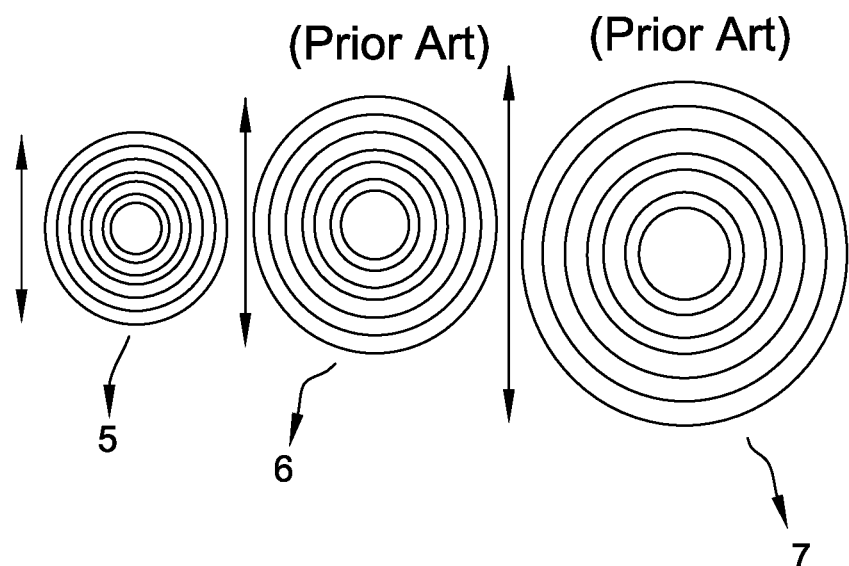
FIG. 2 is a comparative illustration of roll sizes of exemplary laminate of the present invention (designated at 5), of a PRIOR ART conventional commercial waterproofing membrane (designated at 6), and of a PRIOR ART commercial membrane having 60 mils of waterproofing membrane and 60 mils of a foam layer (designated at 7).

As illustrated in FIG. 2, an exemplary composite laminate membrane (5) has seven inch roll diameter roll which is far smaller compared to the ten inch diameter of a typical commercial waterproofing membrane (6) which has a rolled diameter of ten inches, and which is much smaller compared to the thirteen plus (13"+) inch diameter of a rolled PRIOR ART membrane composite (7) having foam layer as taught in U.S. Pat. No. 8,104,245. The three rolls (5/6/7) have standard coverage dimensions (66 feet long×3 feet width); and yet the difference in rolled dimension among these rolls is quite apparent.

In a first example embodiment, the invention provides a method for waterproofing a building or civil engineering substrate surface, comprising:

providing a rolled waterproofing laminate membrane with a removable release sheet, the membrane when unrolled and with release sheet removed having a total composite thickness in the range of 12 mils to 115 mils;

unrolling the waterproofing laminate membrane and positioning the membrane onto a substrate surface, and removing the release sheet during or after unrolling or positioning of the waterproofing laminate membrane, the laminate membrane comprising:
   a) an outer continuous layer having total average thickness in the range of 2 mils to 20 mils, said continuous layer comprising polyolefin or thermoplastic polyurethane and having a partially or entirely embedded reinforcing fibrous or textile structure chosen from mesh, spun-bonded fiber, or random laid fiber, whereby the polymer fills in any voids or interstices within the reinforcing structure to prevent lateral water migration within the laminate membrane when the membrane is installed upon a building or civil engineering surface;
   b) a pressure sensitive adhesive layer having total thickness in the range of 5 mils to 40 mils; and
   c) a closed-cell foam layer having a total thickness in the range of 5 mils to 55 mils and being located intermediate between and attached to each of the outer continuous layer and the pressure sensitive adhesive layer; and
   d) a removable release sheet for protecting the pressure sensitive adhesive layer on a face opposite the face to which it is attached to the closed-cell foam layer, the removable release sheet being removed from the laminate membrane during or after it is unrolled or positioned upon the substrate surface.

In a second example embodiment, which may be based on the first example embodiment above, the invention provides a method wherein the outer continuous layer of the membrane comprises a polyolefin.

In a third example embodiment, which may be based on any of the first through second example embodiments above, the invention provides a method wherein the outer continuous layer of the membrane comprises a polyethylene (e.g., high density polyethylene, low density polyethylene, very low density polyethylene, or mixture thereof), polypropylene, ethylene vinyl acetate, polyolefin plastomers or mixture thereof.

In a first aspect of this third example embodiment, the outer continuous layer comprises a polyethylene and polyolefin plastomer blended together.

In a fourth example embodiment, which may be based on any of the first through third example embodiments above, the invention provides a method wherein the outer continuous layer of the membrane comprises a mesh that comprises a polymer chosen from polypropylene (PP), polyethylene (PE), polyethylene terephthalate (PET), fiberglass, nylon, or a mixture thereof, the mesh being sandwiched between polyethylene films each having thickness in the range of 2 mils to 10 mils. In preferred embodiments, the mesh or scrim should not allow water to migrate laterally through the membrane. For example, the mesh or scrim may be coated with a hydrophobic material.

In a fifth example embodiment, which may be based on any of the first through fourth example embodiments above, the invention provides a method wherein the outer continuous layer of the membrane is made by embedding a woven or nonwoven fabric sheet into thermally-softened polyolefin chosen from polyethylene (e.g., HDPE, LPDE, LLDPE, VLPDE), polypropylene, ethylene vinyl acetate, thermoplastic elastomer, polyolefin plastomer, or mixture thereof, the woven or nonwoven fabric sheet having a thickness in the range of 2 mils to 210 mils.

In a sixth example embodiment, which may be based on any of the first through fifth example embodiments above, the invention provides a method wherein the outer continuous layer of the membrane the outer continuous layer comprises ridges extending perpendicularly from the face. The ridges in this example can be made with sufficient size and shape, as desired by the designer, to enhance resistance to puncture when compared to film not having the ridges.

In a first aspect of this sixth example embodiment, the ridges may have a height of 0.002 to 0.020 inches from the film, and be spaced apart 0.2 to 2.0 inches across the face of continuous polyolefin layer.

In a seventh example embodiment, which may be based on any of the first through sixth example embodiments above, the invention provides a method wherein the outer continuous layer of the membrane comprises high density polyethylene (HDPE).

In an eighth example embodiment, which may be based on any of the first through seventh example embodiments above, the invention provides a method wherein the outer continuous layer of the membrane comprises thermoplastic polyurethane (TPU).

In a ninth example embodiment, which may be based on any of the first through eighth example embodiments above, the invention provides a method wherein the closed cell foam layer of the membrane is made from a polymer which has a flexural modulus of less than 400,000 psi as measured in accordance with ASTM D 790 (2010), and the closed cell foam comprises a polymer chosen from polyethylene (PE), polypropylene (PP), ethylene vinyl acetate (EVA), or a mixture thereof.

In a first aspect of the tenth example embodiment, the flexural modulus is more preferably 500 to 375,000 pounds per square inch (psi), and more preferably 1000 to 350,000 psi, as measured as measured in accordance with ASTM D 790 (2010).

In a tenth example embodiment, which may be based on any of the first through ninth example embodiments above, the invention provides a method wherein the closed cell foam layer of the membrane comprises high density polyethylene, low density polyethylene, or mixture thereof.

In an eleventh example embodiment, which may be based on any of the first through tenth example embodiments above, the invention provides a method wherein the pressure sensitive adhesive comprises a rubber-modified bituminous adhesive or a synthetic polymer.

In a first aspect of the eleventh example embodiment, the pressure sensitive adhesive comprises a synthetic polymer chosen from styrene copolymer (e.g., SIS, SBS, SEBS, SBR), a butyl polymer, an amide polymer, or acrylic polymer.

In a twelfth example embodiment, which may be based on any of the first through eleventh example embodiments above, the invention provides a method wherein the membrane has nail sealability which passes ASTM D 1970 (2015).

In a thirteenth example embodiment, which may be based on any of the first through twelfth example embodiments above, the invention provides a method wherein the substrate surface is a sub-grade concrete wall against which soil containing rocks is backfilled against and making direct contact with the membrane without protection of a separate protection board or mat.

In a fourteenth example embodiment, which may be based on any of the first through twelfth example embodiments above, the invention provides a method wherein the substrate surface is a roofing deck upon which a shingle course or other further weather protection is subsequently fastened over the installed membrane.

In a fifteenth example embodiment, which may be based on any of the first through fourteenth example embodiments above, the invention provides a method wherein the outer continuous layer of the membrane has a series of elevated projections (e.g., ridges) or protuberances on at least one major face or on both major faces.

In a sixteenth example embodiment, the invention is directed to a structure made by any of the first through fifteenth example methods above.

In a seventeenth example embodiment, the invention provides a waterproofing membrane, comprising: a composite layer with a removable release sheet, the membrane composite, when unrolled and with release sheet removed, having a total composite thickness in the range of 20 to 115 mils, and comprising:
 a) an outer continuous layer having total average thickness in the range of 2 mils to 20 mils, said continuous layer comprising polyolefin or thermoplastic polyurethane and having a partially or entirely embedded reinforcing fibrous or textile structure chosen from mesh, spun-bonded fiber, or random laid fiber, whereby the polymer fills in any voids or interstices within the reinforcing structure to prevent lateral water migration while the membrane is installed upon a building or civil engineering surface;
 b) a pressure sensitive adhesive layer having total thickness in the range of 5 mils to 40 mils; and
 c) a closed-cell foam layer having a total thickness in the range of 5 mils to 55 mils and being located intermediate between and attached to each of the outer continuous layer and the pressure sensitive adhesive layer; and
 d) a removable release sheet for protecting the pressure sensitive adhesive layer on a face opposite the face to which it is attached to the closed-cell foam layer, the removable release sheet being removed from the laminate membrane during or after it is unrolled or positioned upon the substrate surface.

In an eighteenth example embodiment, which may be based on the seventeenth example embodiment above, the invention provides a membrane composite wherein the outer continuous layer has a series of elevated projections (e.g., ridges) or protuberances on at least one major face or on both major faces of the outer continuous layer.

In a nineteenth example embodiment, the invention provides a method for installing a waterproofing barrier upon a sloped roofing surface, comprising:
 providing a rolled waterproofing laminate membrane with a removable release sheet, the membrane when unrolled and with release sheet removed having a total composite thickness in the range of 12 mils to 115 mils;
 unrolling the waterproofing laminate membrane and positioning the membrane onto the building surface, and removing the release sheet during or after unrolling or positioning of the waterproofing laminate membrane on the building surface, the laminate membrane comprising:
 a) a continuous outer polyolefin or thermoplastic polyurethane layer having total average thickness in the range of 2 mils to 20 mils;
 b) a pressure sensitive adhesive layer having total thickness in the range of 5 mils to 40 mils; and
 c) a closed-cell foam layer having a total thickness in the range of 5 mils to 55 mils and being located intermediate between and attached to each of the outer continuous layer and the pressure sensitive adhesive layer; and
 d) a removable release sheet for protecting the pressure sensitive adhesive layer on a face opposite the face to which it is attached to the closed-cell foam layer, the removable release sheet being removed from the laminate membrane during or after it is unrolled or positioned upon the building surface.

In a twentieth example embodiment, which may be based on the nineteenth example embodiment above, the invention provides a membrane wherein the continuous outer layer has a series of elevated projections (e.g., ridges) or protuberances on at least one major face or on both major faces.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXEMPLIFICATIONS

Example 1

There are no current industry standard test methods to determine waterproofing performance during backfilling operations. To access the performance of the waterproofing material against damage from backfill, the present inventors developed what they refer to as a "rock tumbler" test. This test involves use of a five gallon pail filled with one quart of rocks. The rocks are graded and sized to less than three inches to simulate standard backfill. Baffles were added to the inner portion of the pail to simulate the falling of rocks when the rocks reach the top of the pail. The pail is rotated on its side at 25 rpm for one hour. Test samples are attached to the baffles and are impinged by the rocks dropping. Test samples are removed after one hour and examined for signs of damage: such as holes, tears or punctures in them.

Typical waterproofing membranes comprising an outer layer of high density polyethylene (HDPE) film to provide the waterproofing layer were tested at two film thicknesses in the rock tumbler. The results are set forth in table 1.

TABLE 1

| Number of Punctures | | |
|---|---|---|
| 4 | mil HDPE film | >50 |
| 8 | mil HDPE film | >25 |

Both films exhibited numerous punctures from rocks. To improve puncture resistance, the present inventors evaluated different foams in the foam layer attached to the HDPE layer. Types of foams evaluated included polyethylene ("PE") and polyethylene blends ("PE blend"), ethylene vinyl acetate ("EVA"), ethylene propylene diene monomer rubber ("EPDM"), and polyethylene terephthalate ("PET"). Results are illustrated in Table 2.

TABLE 2

| Foam | Thickness, " | Density | Type | Rock tumbler- # punctures to HDPE film | Rollable | Lap sealable | Shore A | ASTM E 154 Puncture resistance Max Load, Lb | Plastic Flow-foam Punctures |
|---|---|---|---|---|---|---|---|---|---|
| A | 0.118 | 2 | PE | 1 | Yes | NO | 7 | 12 | pass |
| B | 0.157 | 2 | PE | 0 | Yes | NO | 7 | | |
| C | 0.065 | 4 | PE | 22 | Yes | Yes | 22 | 17.7 | |
| D | 0.094 | 4 | PE | 1 | yes | No | 22 | 16.3 | |
| E | 0.063 | 6 | PE | 7 | Yes | Yes | 33 | | |
| F | 0.105 | 6 | PE | 0 | | No | 33 | | |
| H | 0.06 | 5 | PE blend | 3 | Yes | Yes | | | Pass |
| I | 0.063 | 6 | EVA | 14 | Yes | Yes | 17 | 25.2 | Pass |
| J | 0.031 | 6 | EVA | 30 | Yes | Yes | 17 | | |
| K | 0.0625 | 4 | EPDM | 0 | Yes | Yes | <5 | 8.5 | Fail |
| L | 0.157 | 6 | PET | | No | No | | | |

Results on rock tumbler performance for various foams are shown in Table 2. In addition to the rock tumbler requirements, the present inventors determined that the foam should be rollable, the foam material and thicknesses should permit membranes to seal at overlaps, and the foam material and thickness should meet or exceed plastic flow performance in accordance with ASTM E 154 (2005).

For the polyolefin based foams, the thicker the foam, the better the performance. However, the present inventors determined that foam layer thickness greater than 0.060 inches can defeat satisfactory sealing at membrane overlaps. Furthermore, the present inventors determined that the overall composite membrane roll size will become too large to manage and to ship conveniently. The EPDM foam had excellent rock tumbler performance, however it did not pass the plastic flow test and had poor tear resistance. The PET foam was too stiff and was not found to be rollable. Rollability was evaluated by wrapping the foam around a three-inch (3") core and checking for creasing, cracking, or bending of the foam. Except for the PET foam, all others could be wrapped around a 3" core. This core size is typical for construction waterproofing materials sold in roll form. The closest foam to meet all the requirements was the polyolefin type of foams; although the inventor believes that by itself as a singular layer such foam type may not provide complete resistance to punctures at thicknesses that are less than 0.060 inches.

It is preferable to use a foam made from a material that has a low flexural modulus. This modulus is a measure of materials stiffness prior to breaking or permanently deforming. 1 Table 3 list the flexural modulus for some common polymers, per ASTM D 970. Most preferably to have a modulus less than 300000.

TABLE 3

| | Flexural Modulus, psi |
|---|---|
| EVA | 2470 |
| LDPE | 30000 |
| HDPE | 200,000 |
| PP | 225,000 |
| HIPS | 310,000 |
| PET | 400,000 |

To improve the puncture-resistance performance, the present inventors evaluated a combination of polyolefin film and foam in a simulated backfill test. To measure backfill resistance, the inventors erected an 8 foot wall of concrete. A pressure sensitive adhesive was laminated onto the back of the foam. Samples made as composites of polyolefin film, polyolefin foam, and pressure sensitive adhesive were applied to cement boards. These were then mechanically anchored to a concrete wall and covered with backfill. The backfill consisted of a mix of soil and rocks having average size of less than three inches. Every twelve inches of the backfill was tamped down in accordance with standard industry practice. The wall was left (back)-filled in, and, after one week, the fill was removed so that the installed composite membrane could be evaluated for puncture resistance. Laminates that were seen to be fully penetrated (thus sustaining a "puncture") were subjected to hydrostatic pressure testing (at 60 pounds per square inch) to determine if the puncture lead to leakage. Results are shown in Table 4.

TABLE 4

| Film | Thickness (Mils) | Number of reinforcements/ square inch | Puncture | Hold Hydrostatic Head pressure to 60 psi |
|---|---|---|---|---|
| HDPE/PET Laminate | 4 | N/A | Yes | No |
| PE blend | 13 | N/A | Yes | No |
| PE woven | 7 | 50 | Yes | No |
| PE woven | 12 | 195 | Yes | No |
| Reinforced PE | 12 | 7.2 | No | Yes |

The inventors evaluated a number of different polyolefin films to ascertain which technology was most effective. They discovered surprisingly that the PET/HDPE laminate and PE blend film did not survive the backfill even at a thickness of 13 mil. The inventors then tested the most damaged areas to see if they could withstand a hydrostatic head of water up to 60 psi. The inventors also tested woven materials, which were found to be not effective either, and believed these fared better than film alone (unreinforced). The other problem with woven materials is lateral water migration. There are air gaps along the interstices of the weaves, which can allow water to transfer through the membrane. The inventors also tested a reinforced polyethylene film, and believed that the reinforcement would help to distribute the stress from backfill impacts and hence avoid ruptures and penetrations. The reinforcements can be from scrims embedded in layer of the polyolefin film or raised area on the surface of the polyolefin film form embossed rollers.

In another backfill test, the present inventors evaluated reinforced polyethylene (PE) layer and a thermoplastic polyurethane (TPU) film layer, using the 3" rock/soil blend with no tamping of backfill. The composite membranes were left backfilled for two weeks to allow time for the soil to settle. Results are in shown in Table 5.

TABLE 5

| Film | Thickness, mils | Puncture | Hold Hydrostatic Head to 60 psi |
|---|---|---|---|
| TPU Reinforced | 5 | N | Y |
| PE | 12 | N | Y |

The inventors discovered that neither the reinforced PE layer nor the TPU layer exhibited full punctures (through to the adhesive layer). They performed another backfill test using these two materials and ¾" rock in the backfill to simulate self-tamping of fill (having a force capable of damaging buried electrical or other service lines). The walls were dug up a week later and examined for punctures. However, no punctures were visible for either PE or TPU layers.

While waterproofing membranes used in sloped roofing applications have similar performance requirements as compared to below-grade applications on concrete, roofing membranes must be able to seal at nail penetration openings. Current technology uses a thick layer of soft rubberized asphalt to flow around the nail shank. Typical products use 36 mils of this adhesive to provide nail sealability. This results in a bulky, heavy, and hard to use products. A typical 200 square foot roll of roofing membrane used for ice dam protection can weigh up to 40 pounds or more. These rolls are usually required to be carried up a ladder to the roof. Thus it would be desirous to have a lightweight, easier to use waterproofing membrane for sloped roof applications.

The inventors unexpectedly found that some foams are able to seal the nail penetration against water by themselves.

Samples were tested for nail sealability using a modified version of ASTM D1970 (2015). Nails were driven to ⅛" above the test sample surface, and the sample was exposed to five inch standing water at 40° F. for 48 hours. To be considered a pass, there can be no water on the plywood, nail shank, or in the can underneath the test sample. Results are shown in Table 6 below.

TABLE 6

| Foam Type | Foam density | Foam thickness, mils | # pass/ total |
|---|---|---|---|
| PE | 12 pcf | 20 | 3/3 |
| PE | 15.5 pcf | 27 | 0/3 |
| PE | 18 pcf | 22 | 1/3 |
| PET | 6 pcf | 157 | 0/3 |

Some of the PE foams passed without any adhesive. It was thought that the thicker foam at 157 mils thickness performed better, but thickness in and of itself does not provide or ensure nail (or other fastener) seal-ability. The softer polyolefin types performed significantly better in this regard.

To evaluate the effect of a pressure sensitive adhesive, 5 mils of a pressure sensitive adhesive was laminated onto the above new samples and tested. Results are shown in Table 7 below.

TABLE 7

| Foam Type | Foam density | Foam thickness, mils | # pass/ total |
|---|---|---|---|
| PE + 5 mils PSA | 12 pcf | 20 | 3/3 |
| PE + 5 mils PSA | 15.5 pcf | 27 | 2/3 |
| PE + 5 mils PSA | 18 pcf | 22 | 1/3 |
| PET + 5 mils PSA | 6 pcf | 157 | 0/3 |

Adding the adhesive did improve nail sealability on some samples, but this did not appear to provide a dispositive or overwhelming effect. The use of the configuration described in ASTM D1970 (2015), wherein nail sealability is tested using a roofing shingle over the membrane, was used to see if any of the membrane laminates would pass the test. Results are shown in Table 8 below.

TABLE 8

| Foam Type | Foam density | Foam thickness, mils | # pass/ total |
|---|---|---|---|
| PE + 5 mils PSA | 12 pcf | 20 | 3/3 |
| PE + 5 mils PSA | 15.5 pcf | 27 | 2/3 |
| PE + 5 mils PSA | 18 pcf | 22 | 3/3 |
| PET + 5 mils PSA | 6 pcf | 157 | 2/3 |

The above examples show that adding a polyolefin foam significantly improves the nail sealability of the membrane.

The foregoing example and embodiments were present for illustrative purposes only and not intended to limit the scope of the invention.

We claim:

1. A method for providing a waterproofing barrier upon a sloped roofing surface, comprising:
   providing a rolled waterproofing laminate membrane with a removable release sheet, the membrane when unrolled and with release sheet removed having a total composite thickness in the range of 12 mils to 115 mils;
   unrolling the waterproofing laminate membrane and positioning the membrane onto the building surface, and removing the release sheet during or after unrolling or positioning of the waterproofing laminate membrane on the building surface, the laminate membrane comprising:
   a) a continuous outer layer comprising polyolefin or thermoplastic polyurethane and having a total average thickness in the range of 2 mils to 20 mils;
   b) a pressure sensitive adhesive layer having total thickness in the range of 5 mils to 40 mils; and
   c) a closed-cell foam layer having a total thickness in the range of 5 mils to 55 mils and being located intermediate between and attached to each of the outer continuous layer and the pressure sensitive adhesive layer, wherein the closed cell foam layer is made from a polymer which has a flexural modulus of less than 400,000 psi as measured in accordance with ASTM D 790; and
   d) a removable release sheet for protecting the pressure sensitive adhesive layer on a face opposite the face to which it is attached to the closed-cell foam layer, the removable release sheet being removed from the laminate membrane during or after it is unrolled or positioned upon the building surface.

2. The method of claim 1 wherein the continuous outer layer has a series of elevated projections or protuberances on at least one major face or on both major faces.

3. A method for waterproofing a building or civil engineering substrate surface, comprising:

providing a rolled waterproofing laminate membrane with a removable release sheet, the membrane when unrolled and with release sheet removed having a total composite thickness in the range of 12 mils to 115 mils;

unrolling the waterproofing laminate membrane and positioning the membrane onto a substrate surface, and removing the release sheet during or after unrolling or positioning of the waterproofing laminate membrane, the laminate membrane comprising:

a) an outer continuous layer having total average thickness in the range of 2 mils to 20 mils, said outer continuous layer comprising polyolefin or thermoplastic polyurethane and having a partially or entirely embedded reinforcing fibrous or textile structure chosen from mesh, spun-bonded fiber, or random laid fiber, whereby the polymer fills in any voids or interstices within the reinforcing structure to prevent lateral water migration within the laminate membrane when the membrane is installed upon a building or civil engineering surface;

b) a pressure sensitive adhesive layer having total thickness in the range of 5 mils to 40 mils; and c) a closed-cell foam layer having a total thickness in the range of 5 mils to 55 mils and being located intermediate between and attached to each of the outer continuous layer and the pressure sensitive adhesive layer; and d) a removable release sheet for protecting the pressure sensitive adhesive layer on a face opposite the face to which it is attached to the closed-cell foam layer, the removable release sheet being removed from the laminate membrane during or after it is unrolled or positioned upon the substrate surface, wherein the closed cell foam layer is made from a polymer which has a flexural modulus of less than 400,000 psi as measured in accordance with ASTM D 790.

4. The method of claim 3 wherein the outer continuous layer comprises a polyolefin.

5. The method of claim 3 wherein the outer continuous layer comprises a polyethylene, polypropylene, ethylene vinyl acetate, polyolefin plastomer, or mixture thereof.

6. The method of claim 3 wherein the outer continuous layer comprises a mesh that comprises a polymer chosen from polypropylene (PP), polyethylene (PE), polyethylene terephthalate (PET), fiberglass, nylon, or a mixture thereof, the mesh being sandwiched between polyethylene films each having thickness in the range of 2 mils to 10 mils.

7. The method of claim 3 wherein the outer continuous layer is made by embedding a woven or nonwoven fabric sheet into thermally-softened polyolefin chosen from polyethylene, polypropylene, ethylene vinyl acetate, thermoplastic elastomer, polyolefin plastomer, or mixture thereof, the woven or nonwoven fabric sheet having a thickness in the range of 2 mils to 210 mils.

8. The method of claim 3 wherein the outer continuous layer comprises ridges extending perpendicularly from the face.

9. The method of claim 3 wherein the outer continuous layer comprises high density polyethylene (HDPE).

10. The method of claim 3 wherein the outer continuous layer comprises thermoplastic polyurethane (TPU).

11. The method of claim 3 wherein the closed cell foam layer comprises a polymer chosen from polyethylene (PE), polypropylene (PP), ethylene vinyl acetate (EVA), or a mixture thereof.

12. The method of claim 11 wherein the closed cell foam layer comprises high density polyethylene, low density polyethylene, or mixture thereof.

13. The method of claim 1 wherein the pressure sensitive adhesive comprises a rubber-modified bituminous adhesive or a synthetic polymer.

14. The method of claim 1 wherein the membrane has nail sealability in accordance with ASTM D 1970 (2015).

15. The method of claim 1 wherein the substrate surface is a sub-grade concrete wall against which soil containing rocks is backfilled against and making direct contact with the membrane without protection of a separate protection board or mat.

16. The method of claim 1 wherein the substrate surface is a roofing deck upon which a shingle course or other further weather protection is subsequently fastened over the installed membrane.

17. The method of claim 1 wherein the outer continuous layer has a series of elevated projections or protuberances on at least one major face or on both major faces.

18. A structure provided by the method of claim 1.

19. A waterproofing membrane, comprising: a composite with removable release sheet, the membrane composite, when unrolled and with release sheet removed, having a total composite thickness in the range of 20 to 115 mils, the membrane composite comprising:

a) an outer continuous layer having total average thickness in the range of 2 mils to 20 mils, said outer continuous layer comprising polyolefin or thermoplastic polyurethane and having a partially or entirely embedded reinforcing fibrous or textile structure chosen from mesh, spun-bonded fiber, or random laid fiber, whereby the polymer fills in any voids or interstices within the reinforcing structure to prevent lateral water migration while the membrane is installed upon a building or civil engineering surface;

b) a pressure sensitive adhesive layer having total thickness in the range of 5 mils to 40 mils; and c) a closed-cell foam layer having a total thickness in the range of 5 mils to 55 mils and being located intermediate between and attached to each of the outer continuous layer and the pressure sensitive adhesive layer, wherein the closed cell foam layer is made from a polymer which has a flexural modulus of less than 400,000 psi as measured in accordance with ASTM D 790; and d) a removable release sheet for protecting the pressure sensitive adhesive layer on a face opposite the face to which it is attached to the closed-cell foam layer, the removable release sheet being removed from the laminate membrane during or after it is unrolled or positioned upon the substrate surface.

20. The membrane of claim 19 wherein the outer continuous layer has a series of elevated projections or protuberances on at least one major face or on both major faces.

* * * * *